US008211954B2

(12) United States Patent
Gruber et al.

(10) Patent No.: US 8,211,954 B2
(45) Date of Patent: Jul. 3, 2012

(54) RADIATION-HARDENABLE COMPOUNDS

(75) Inventors: Nick Gruber, Mannheim (DE);
Reinhold Schwalm, Wachenheim (DE);
Erich Beck, Ladenburg (DE); Yvonne Heischkel, Mannheim (DE); Gabriele Dlugosch, Worms (DE); Peter Thuery, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1044 days.

(21) Appl. No.: 11/722,282

(22) PCT Filed: Dec. 21, 2005

(86) PCT No.: PCT/EP2005/013763
§ 371 (c)(1),
(2), (4) Date: Jun. 20, 2007

(87) PCT Pub. No.: WO2006/069690
PCT Pub. Date: Jul. 6, 2006

(65) Prior Publication Data
US 2010/0029800 A1 Feb. 4, 2010

(30) Foreign Application Priority Data
Dec. 22, 2004 (DE) .................. 10 2004 063 102

(51) Int. Cl.
*C08L 75/14* (2006.01)
*C08L 75/16* (2006.01)
*C08F 283/00* (2006.01)
*C08G 18/04* (2006.01)
*C08G 18/87* (2006.01)

(52) U.S. Cl. .............. 522/97; 522/90; 522/96; 522/174; 525/127; 525/453; 525/455; 528/49; 528/57; 528/58; 528/75

(58) Field of Classification Search ............... 522/90, 522/95, 174, 96, 97; 525/453, 455, 127; 528/49, 57, 58, 75
See application file for complete search history.

(56) References Cited

U.S. PATENT DOCUMENTS

| 4,195,146 | A | * | 3/1980 | Markiewitz et al. | 526/261 |
|---|---|---|---|---|---|
| 5,739,251 | A | * | 4/1998 | Venham et al. | 528/49 |
| 5,951,911 | A | * | 9/1999 | Venham et al. | 252/182.2 |
| 6,479,564 | B1 | * | 11/2002 | Schwalm et al. | 522/96 |
| 6,617,413 | B1 | * | 9/2003 | Bruchmann et al. | 528/75 |
| 7,576,143 | B2 | * | 8/2009 | Schwalm et al. | 522/174 |
| 2008/0220250 | A1 | * | 9/2008 | Ortmeier et al. | 428/339 |

FOREIGN PATENT DOCUMENTS

| DE | 196 18 720 | 11/1996 |
|---|---|---|
| DE | 198 26 712 | 12/1999 |
| DE | 198 60 041 | 6/2000 |
| DE | 199 13 353 | 9/2000 |
| DE | 199 57 900 | 6/2001 |
| DE | 102 46 512 | 4/2004 |
| DE | 10 2004 055 363 A1 | 11/2005 |
| EP | 0 007 508 | 2/1980 |
| EP | 0 057 474 | 8/1982 |
| EP | 0 092 269 | 10/1983 |
| EP | 0 495 751 | 7/1992 |
| EP | 0 615 980 | 9/1994 |
| EP | 0 867 457 | 9/1998 |
| WO | 98 33761 | 8/1998 |
| WO | 00 39183 | 7/2000 |
| WO | WO 2005/099943 A2 * | 10/2005 |

OTHER PUBLICATIONS

Ullmanns Encyklopaedie Der Technischen Chemie, "Polyacryl-Verbindungen Bis Quecksilber", 4. Aufl., vol. 19, pp. 62-65.
Advances in Polymer Science, "Fortschritte Der Hochpolymeren-Forschung", vol. 14, Springer, pp. 51-86, 1974.
Polymer Handbook, 2 Aufl., Wiley & Sons, New York, pp. II-1-II-43.
K. K. Dietliker, "Chemistry and Technology of UV-and EB-Formulation for Coatings, Inks and Paints", vol. 3, Photoinitiators for Free Radical and Cationic Polymerisation, P. K. T. Oldring (Eds.), Sita Technology Ltd., London, pp. 115-298.

* cited by examiner

*Primary Examiner* — Rabon Sergent
(74) *Attorney, Agent, or Firm* — Oblon, Spivak, McClelland, Maier & Neustadt, L.L.P.

(57) ABSTRACT

Radiation-curable compounds, processes for the preparation thereof, the use thereof and coating materials comprising them and having high scratch resistance, which compounds are polyurethanes comprising allophanate groups and obtained by reaction of di- or polyisocyanates and at least two different compounds, each having at least one group reactive toward isocyanate and at least one unsaturated group capable of free radical polymerization.

19 Claims, No Drawings

RADIATION-HARDENABLE COMPOUNDS

The invention relates to radiation-curable compounds, processes for the preparation thereof, the use thereof and coating materials comprising them and having high scratch resistance.

WO 00/39183 describes polyisocyanates which contain allophanate groups and carry activated C=C double bonds capable of free radical polymerization.

A disadvantage of these polyisocyanates is that, for curing in finishes, they require a binder which must comprise groups reactive toward isocyanate. Such further components must be metered in in an exact stoichiometry, which may give rise to insufficient curing in the event of incorrect doses.

DE 102 46 512 describes a different process for the preparation of the same compounds as described in WO 00/39183, and different subsequent products of these compounds, some of which likewise comprise free isocyanate groups and thus likewise have to be cured by metering in a binder in an exact stoichiometry. In some cases, subsequent products without free isocyanate groups are also disclosed (example 21), which products can be cured exclusively by radiation curing. However, the subsequent products disclosed there give coatings having insufficient hardness and scratch resistance. Example 2 of DE 102 46 512 relates to a polyisocyanate which has been reacted to a high degree with hydroxyethyl acrylate and comprises substantially acrylate groups as groups having curing activity.

It was an object of the present invention to provide radiation-curable compounds which have a low viscosity and are curable mainly by radiation and at most to a minor extent according to other curing mechanisms. They should be one-component coating materials in order to rule out the incorrect doses possible in the case of two-component systems on failure to maintain an optimum stoichiometry, which coating materials give coatings having high hardness and scratch resistance.

The object was achieved by polyurethanes containing allophanate groups and comprising, as components, (a) at least one organic aliphatic, aromatic or cycloaliphatic di- or polyisocyanate,
(b) at least two different compounds (b1) and (b2) having in each case at least one group reactive toward isocyanate and at least one unsaturated group capable of free radical polymerization,
(c) if appropriate, at least one compound having exactly two groups reactive toward isocyanate,
(d) if appropriate, at least one compound having at least three groups reactive toward isocyanate and
(e) if appropriate, at least one compound having exactly one group reactive toward isocyanate.

According to the invention, the polyurethanes comprise allophanate groups; the content of allophanate groups in such polyurethanes according to the invention (calculated as $C_2N_2HO_3$=101 g/mol) is preferably from 1 to 28% by weight, preferably from 3 to 25% by weight.

In a preferred embodiment of the present invention, at least 20 mol %, preferably at least 25 mol %, particularly preferably at least 30 mol %, very particularly preferably at least 35 mol %, in particular at least 40 mol % and especially at least 50 mol % of the compounds (b1) and (b2) having in each case at least one group reactive toward isocyanate and at least one unsaturated group capable of free radical polymerization, which form components of the polyurethanes according to the invention, are bonded to allophanate groups.

The reaction mixtures obtained in the preparation of the polyurethanes according to the invention have, as a rule, a number average molecular weight $M_n$ of less than 10 000 g/mol, preferably of less than 5000 g/mol, particularly preferably of less than 4000 and very particularly preferably of less than 2000 g/mol (determined by gel permeation chromatography using tetrahydrofuran and polystyrene as a standard).

In order to reduce the content of oxadiazinetrione groups, as described, for example, in DE-A1 102 46 512, a complicated aftertreatment of polyisocyanates is necessary, such as, for example, heating for several hours under reduced pressure, if appropriate supported by stripping with a gas stream. According to the invention, it is therefore preferable to keep the content of oxadiazinetrione groups low from the outset by using low-oxadiazinetrione or oxadiazinetrione-free isocyanates, for example where the content of oxadiazinetrione groups in the isocyanates used (calculated as $C_3N_2O_4$=128 g/mol) is less than 15% by weight, preferably less than 10, particularly preferably less than 8, very particularly preferably less than 5, in particular less than 2.5 and especially less than 1% by weight.

In a preferred embodiment, the polyurethanes according to the invention have as low as possible a content of oxidiazinetrione groups, for example less than 0.7% by weight (calculated as $C_3N_2O_4$=128 g/mol), preferably less than 0.6, particularly preferably less than 0.5, particularly preferably less than 0.3, very particularly preferably less than 0.2, in particular less than 0.1 and especially less than 0.05% by weight. This is of interest particularly when the prepared coating material also comprises, in addition to the polyurethanes according to the invention, binders which have groups reactive toward isocyanate, since, as a result of a reaction of groups reactive toward isocyanate with oxadiazinetriones, $CO_2$ can be liberated therefrom and can form bubbles in the coating material and thus lead to coating defects.

In a further preferred embodiment, it is sufficient for the polyurethanes according to the invention if they have a content of oxadiazinetrione groups which is from 0.2 to 0.6% by weight, preferably from 0.3 to 0.5, particularly preferably from 0.35 to 0.45 (calculated as $C_3N_2O_4$=128 g/mol). This is of interest particularly when, apart from the polyurethanes according to the invention, the prepared coating material comprises no further binders which have groups reactive toward isocyanate. In this case, there is as a rule no possibility of the reaction described above in which $CO_2$ might be liberated, so that such a content of oxadiazinetrione groups is as a rule tolerable.

The proportion of other groups forming from isocyanate groups, particularly isocyanurate, biuret, uretdione, iminooxadiazinetrione and/or carbodiimide groups, plays a minor role according to the invention.

In a preferred embodiment of the invention, the polyurethanes according to the invention have virtually no more free isocyanate groups, i.e. the content of free isocyanate groups is less than 0.5% by weight, preferably less than 0.3, particularly preferably less than 0.2, very particularly preferably less than 0.1, in particular less than 0.05 and especially 0% by weight.

Suitable components (a) are, for example, aliphatic, aromatic and cycloaliphatic di- and polyisocyanates having an NCO functionality of at least 1.8, preferably from 1.8 to 5 and particularly preferably from 2 to 4, and the isocyanurates, biurets, allophanates and uretdiones thereof, but preferably the diisocyanates in monomeric form.

The content of isocyanate groups, calculated as NCO=42 g/mol, is as a rule from 5 to 25% by weight.

The diisocyanates are preferably isocyanates having 4 to 20 carbon atoms. Examples of conventional diisocyanates are aliphatic diisocyanates, such as tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, tetramethyl-xylylene diisocyanate, trimethylhexane diisocyanate or tetramethylhexane diisocyanate or 3 (or 4), 8 (or 9)-bis(isocyanatomethyl)tricyclo[5.2.1.0$^{2,6}$]decane isomer mixtures, cycloaliphatic diisocyanates, such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanato-methylcyclohexane) (isophorone diisocyanate), 1,3- or 1,4-bis(isocyanatomethyl)cyclo-hexane or 2,4- or 2,6-diisocyanato-1-methyl-cyclohexane, and aromatic diisocyanates, such as toluene 2,4- or 2,6-diisocyanate and the isomer mixtures thereof, m- or p-xylylene diisocyanate, 2,4'- or 4,4'-diisocyanatodiphenylmethane and the isomer mixtures thereof, phenylene 1,3- or 1,4-diisocyanate, 1-chlorophenylene 2,4-diisocyanate, naphthylene 1,5-diisocyanate, biphenylene 4,4'-diisocyanate, 4,4'-diisocyanato-3,3'-dimethylbiphenyl, 3-methyl-diphenylmethane 4,4'-diisocyanate, tetramethylxylylene diisocyanate, 1,4-diisocyanatobenzene or 4,4'-diisocyanato-diphenyl ether.

Mixtures of the diisocyanates mentioned may also be present.

Hexamethylene diisocyanate, 1,3-bis(isocyanatomethyl)cyclohexane, isophorone diisocyanate and di(isocyanatocyclohexyl)methane are preferred, and hexamethylene diisocyanate is particularly preferred.

Suitable polyisocyanates are polyisocyanates having isocyanurate groups, uretdione diisocyanates, polyisocyanates having biuret groups, polyisocyanates having urethane or allophanate groups, polyisocyanates comprising oxadiazinetrione groups, uretonimine-modified polyisocyanates of linear or branched $C_4$-$C_{20}$-alkylene diisocyanates, cycloaliphatic diisocyanates having altogether 6 to 20 carbon atoms or aromatic diisocyanates having altogether 8 to 20 carbon atoms or mixtures thereof.

The di- and polyisocyanates which may be used preferably have a content of isocyanate groups (calculated as NCO, molecular weight=42) of from 10 to 60% by weight, based on the di- and polyisocyanate (mixture), preferably from 15 to 60% by weight and particularly preferably from 20 to 55% by weight.

Aliphatic or cycloaliphatic di- and polyisocyanates are preferred, for example the abovementioned aliphatic or cycloaliphatic diisocyanates, or mixtures thereof.

The following are furthermore preferred

1) Polyisocyanates of aromatic, aliphatic and/or cycloaliphatic diisocyanates, which polyisocyanates have isocyanurate groups. Particularly preferred here are the corresponding aliphatic and/or cycloaliphatic isocyanatoisocyanurates and in particular those based on hexamethylene diisocyanate and isophorone diisocyanate. The present isocyanurates are in particular trisisocyanatoalkyl- or trisisocyanatocycloalkyl isocyanurates, which are cyclic trimers of the diisocyanates, or mixtures with their higher homologs having more than one isocyanurate ring. The isocyanatoisocyanurates have in general an NCO content of from 10 to 30% by weight, in particular from 15 to 25% by weight, and an average NCO functionality of from 3 to 4.5.

2) Uretdione diisocyanates having aromatically, aliphatically and/or cycloaliphatically bonded isocyanate groups, preferably aliphatically and/or cycloaliphatically bonded isocyanate groups, and in particular those derived from hexamethylene diisocyanate and isophorone diisocyanate. Uretdione diisocyanates are cyclic dimerization products of diisocyanates. The uretdione diisocyanates can be used in the formulations as the sole component or as a mixture with other polyisocyanates, in particular those mentioned under 1).

3) Polyisocyanates having biuret groups and having aromatically, cycloaliphatically or aliphatically bonded, preferably cycloaliphatically or aliphatically bonded, isocyanate groups, in particular tris(6-isocyanatohexyl)biuret or mixtures thereof with its higher homologs. These polyisocyanates having biuret groups generally have an NCO content of from 18 to 25% by weight and an average NCO functionality from 3 to 4.5.

4) Polyisocyanates having urethane and/or allophanate groups and having aromatically, aliphatically or cycloaliphatically bonded, preferably aliphatically or cycloaliphatically bonded, isocyanate groups, as can be obtained, for example, by reaction of excess amounts of hexamethylene diisocyanate or of isophorone diisocyanate with polyhydric alcohols, such as, for example, trimethylolpropane, neopentylglycol, pentaerythritol, 1,4-butanediol, 1,6-hexanediol, 1,3-propanediol, ethylene glycol, diethylene glycol, glycerol, 1,2-dihydroxypropane or mixtures thereof, preferably with at least one compound (b), preferably 2-hydroxyethyl (meth)acrylate. These polyisocyanates having urethane and/or allophanate groups generally have an NCO content of from 12 to 20% by weight and an average NCO functionality of at least 2, preferably at least 2.1 and particularly preferably from 2.5 to 3.

5) Polyisocyanates comprising oxadiazinetrione groups, preferably derived from hexamethylene diisocyanate or isophorone diisocyanate. Polyisocyanates comprising such oxadiazinetrione groups can be prepared from diisocyanate and carbon dioxide. However, it may be appropriate to take into account the abovementioned content of oxadiazinetrione groups.

Uretonimine-Modified Polyisocyanates.

The polyisocyanates 1) to 6) can be used as a mixture, if appropriate also as a mixture with diisocyanates.

According to the invention, suitable components (b) are at least two different compounds (b1) and (b2) which carry at least one group reactive toward isocyanate and at least one group capable of free radical polymerization.

In a preferred embodiment of the invention, the compound (b1) is a compound having exactly one group reactive toward isocyanate and exactly one unsaturated group capable of free radical polymerization, and compound (b2) is a compound having exactly one group reactive toward isocyanate and at least two, preferably two to five, particularly preferably two to four and very particularly preferably two or three unsaturated groups capable of free radical polymerization.

The components (b) preferably have a molecular weight of less than 10 000 g/mol, particularly preferably less than 5000 g/mol, very particularly preferably less than 4000 g/mol and in particular less than 3000 g/mol. Specific compounds (b) have a molecular weight of less than 1000 or even less than 600 g/mol.

Groups reactive toward isocyanate may be, for example, —OH, —SH, —NH$_2$ and —NHR$^1$, where R$^1$ is hydrogen or an alkyl group comprising 1 to 4 carbon atoms, such as, for example, methyl, ethyl, n-propyl, isopropyl, n-butyl, isobutyl, sec-butyl or tert-butyl.

Components (b) may be, for example, monoesters of α,β-unsaturated carboxylic acids, such as acrylic acid, methacrylic acid, crotonic acid, itaconic acid, fumaric acid, maleic acid, acrylamidoglycolic acid or methacrylamidoglycolic acid, or vinyl ethers with di- or polyols, which preferably have 2 to 20 carbon atoms and at least two hydroxyl groups, such as ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, pentaethylene glycol, tripropylene glycol, 1,2-, 1,3- or 1,4-butane-diol, 1,5-pentanediol, neopentylglycol, 1,6-hexanediol, 2-methyl-1,5-pentanediol, 2-ethyl-1,4-butanediol, 1,4-dimethylolcyclohexane, 2,2-bis(4-hydroxycyclo-hexyl)propane, glycerol, trimethylolethane, trimethylolpropane, trimethylolbutane, pentaerythritol, ditrimethylolpropane, erythritol, sorbitol, poly-THF having a molecular weight of from 162 to 2000, poly-1,3-propanediol having a molecular weight of from 134 to 400 or polyethylene glycol having a molecular weight of from 238 to 458. Furthermore, esters or amides of (meth)acrylic acid with amino alcohols, e.g. 2-aminoethanol, 2-(methylamino)ethanol, 3-amino-1-propanol, 1-amino-2-propanol or 2-(2-aminoethoxy)ethanol, 2-mercaptoethanol or polyaminoalkanes, such as ethylenediamine or diethylenetriamine, or vinylacetic acid may also be used.

Furthermore, unsaturated polyetherols or polyesterols or polyacrylate-polyols having an average OH functionality of from 2 to 10 are also suitable, although less preferable.

Examples of amides of ethylenically unsaturated carboxylic acids with aminoalcohols are hydroxyalkyl(meth)acrylamides, such as N-hydroxymethylacrylamide, N-hydroxymethylmethacrylamide, N-hydroxyethylacrylamide, N-hydroxyethylmethacrylamide or 5-hydroxy-3-oxapentyl (meth)acrylamide, N-hydroxyalkylcrotonamides, such as N-hydroxymethylcrotonamide, and N-hydroxyalkylmaleinimides, such as N-hydroxy-ethylmaleinimide.

2-Hydroxyethyl(meth)acrylate, 2- or 3-hydroxypropyl (meth)acrylate, 1,4-butanediol mono(meth)acrylate, neopentylglycol mono(meth)acrylate, 1,5-pentanediol mono(meth) acrylate, 1,6-hexanediol mono(meth)acrylate, glyceryl mono- and di(meth)acrylate, trimethylolpropane mono- and di(meth)acrylate, pentaerythrityl mono-, di- and tri(meth) acrylate, and 4-hydroxybutyl vinyl ether, 2-aminoethyl (meth)acrylate, 2-aminopropyl(meth)acrylate, 3-aminopropyl(meth)acrylate, 4-aminobutyl(meth)acrylate, 6-aminohexyl(meth)acrylate, 2-thioethyl(meth)acrylate, 2-aminoethyl(meth)acrylamide, 2-aminopropyl(meth)acrylamide, 3-aminopropyl-(meth)acrylamide, 2-hydroxyethyl (meth)acrylamide, 2-hydroxypropyl(meth)acrylamide or 3-hydroxypropyl(meth)acrylamide are preferably used. 2-Hydroxyethyl acrylate, 2-hydroxyethylmethacrylate, 2- or 3-hydroxypropyl acrylate, 1,4-butanediol monoacrylate, 3-(acryloyloxy)-2-hydroxypropyl(meth)acrylate and the monoacrylates of polyethylene glycol having a molar mass of from 106 to 238 are particularly preferred.

In a preferred embodiment, the component (b1) is selected from the group consisting of 2-hydroxyethyl acrylate, 2-hydroxyethyl methacrylate, 2- or 3-hydroxypropyl acrylate and 1,4-butanediol monoacrylate, preferably from 2-hydroxyethyl acrylate and 2-hydroxyethyl methacrylate, and particularly preferably it is 2-hydroxyethyl acrylate, and the component (b2) is selected from the group consisting of the 1,2- or 1,3-diacrylate of glycerol, trimethylolpropane diacrylate, pentaerythrityl triacrylate, ditrimethylolpropane triacrylate and dipentaerythrityl pentaacrylate.

In a particularly preferred embodiment, the component (b2) is an industrial mixture from the acrylation of trimethylolpropane, pentaerythritol, ditrimethylolpropane or dipentaerythritol. It is generally a mixture of completely and incompletely acrylated polyols. Very particularly preferred compounds (b2) are industrial mixtures from the acrylation of pentaerythritol, which generally have an OH number, according to DIN 53240, of from 99 to 115 mg KOH/g and predominantly comprise pentaerythrityl triacrylate and pentaerythrityl tetraacrylate, and may comprise minor amounts of pentaerythrityl diacrylate. This has the advantage that pentaerythrityl tetraacrylate is not incorporated into the polyurethane according to the invention but simultaneously acts as a reactive diluent.

Suitable components (c) are compounds which have exactly two groups reactive toward isocyanate, for example —OH, —SH, —NH$_2$ or —NHR$^2$, where R$^2$ therein, independently of one another, may be hydrogen, methyl, ethyl, isopropyl, n-propyl, n-butyl, isobutyl, sec-butyl or tert-butyl.

These are preferably diols having 2 to 20 carbon atoms, e.g. ethylene glycol, 1,2-propanediol, 1,3-propanediol, 1,1-dimethylethane-1,2-diol, 2-butyl-2-ethyl-1,3-propanediol, 2-ethyl-1,3-propanediol, 2-methyl-1,3-propanediol, neopentylglycol, neopentylglycol hydroxypivalate, 1,2-, 1,3- or 1,4-butanediol, 1,6-hexanediol, 1,10-decanediol, bis(4-hydroxycyclohexane)isopropylidene, tetramethylcyclobutanediol, 1,2-, 1,3- or 1,4-cyclohexanediol, cyclooctanediol, norbornanediol, pinanediol, decalindiol, 2-ethyl-1,3-hexanediol, 2,4-diethyloctane-1,3-diol, hydroquinone, bisphenol A, bisphenol F, bisphenol B, bisphenol S, 2,2-bis(4-hydroxycyclohexyl)propane, 1,1-, 1,2-, 1,3- and 1,4-cyclohexanedimethanol, 1,2-, 1,3- or 1,4-cyclohexanediol, poly-THF having a molar mass of from 162 to 2000, poly-1,2-propanediol or poly-1,3-propanediol having a molar mass of from 134 to 1178 or polyethylene glycol having a molar mass of from 106 to 2000, and aliphatic diamines, such as methylene- and isopropylidene-bis(cyclohexylamine), piperazine, 1,2-, 1,3- or 1,4-diaminocyclohexane, 1,2-, 1,3- or 1,4-cyclohexanebis(methylamine), etc., dithiols or polyfunctional alcohols, secondary or primary amino alcohols, such as ethanolamine, monopropanolamine, etc., or thioalcohols, such as thioethylene glycol.

The cycloaliphatic diols, such as, for example, bis(4-hydroxycyclohexane)-isopropylidene, tetramethylcyclobutanediol, 1,2-, 1,3- or 1,4-cyclohexanediol, 1,1-, 1,2-, 1,3- and 1,4-cyclohexanedimethanol, cyclooctanediol or norbornanediol are particularly suitable here.

The optional components (d) are at least one compound having at least three groups reactive toward isocyanate.

For example, the components (d) may have from 3 to 6, preferably from 3 to 5, particularly preferably 3 or 4 and very particularly preferably 3 groups reactive toward isocyanate.

The molecular weight of the components (d) is as a rule not more than 2000 g/mol, preferably not more than 1500 g/mol, particularly preferably not more than 1000 g/mol and very particularly preferably not more than 500 g/mol.

These are preferably polyols having 2 to 20 carbon atoms, for example trimethylolbutane, trimethylolpropane, trimethylolethane, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol and isomalt; trimethylolpropane, pentaerythritol and glycerol are particularly preferred and trimethylolpropane is very particularly preferred.

Optional components (e) are those comprising, if appropriate, at least one compound having exactly one group reactive toward isocyanate.

These are preferably monools, particularly preferably alkanols and very particularly preferably alkanols having 1 to 20, preferably 1 to 12, particularly preferably 1 to 6, very particularly preferably 1 to 4 and in particular 1 or 2 carbon atoms.

Examples of these are methanol, ethanol, isopropanol, n-propanol, n-butanol, isobutanol, sec-butanol, tert-butanol, n-hexanol, n-heptanol, n-octanol, n-decanol, n-dodecanol (lauryl alcohol), 2-ethylhexanol, cyclopentanol, cyclohexanol, cyclooctanol, cyclododecanol, ethylene glycol monomethyl ether, ethylene glycol monoethyl ether, diethylene glycol or 1,3-propanediol monomethyl ether; methanol, ethanol, isopropanol, n-propanol, n-butanol, tert-butanol, n-hexanol, 2-ethylhexanol, cyclopentanol, cyclohexanol and cyclododecanol are preferred, methanol, ethanol, isopropanol, n-propanol, n-butanol and tert-butanol are particularly preferred, and methanol and ethanol are very particularly preferred, especially methanol.

In a preferred embodiment, the monools may be said cycloaliphatic alcohols, preferably cyclopentanol or cyclohexanol, particularly preferably cyclohexanol.

In a further preferred embodiment, the monools may be said aliphatic alcohols having 6 to 20 carbon atoms, particularly preferably those having 8 to 20 carbon atoms, very particularly preferably those having 10 to 20 carbon atoms.

In a particularly preferred embodiment, the monools are said aliphatic alcohols, very particularly preferably those having 1 to 4 carbon atoms, in particular methanol.

The polyurethanes which may be used according to the invention are obtained by reacting the components (a), (b1) and (b2) and, if appropriate, (c) and/or (d) and/or (e) with one another.

If the molar composition (a):(b1):(b2):(c):(d):(e) per 1 mol of reactive isocyanate groups in (a) is as a rule as follows:
(b1) 1-50, preferably 5-40, particularly preferably 10-37.5 and in particular 15-33 mol % of groups reactive toward isocyanate,
(b2) 1-50, preferably 5-40, particularly preferably 10-33 and in particular 15-25 mol % of groups reactive toward isocyanate,
(c) 0-50, preferably 0-30, particularly preferably 0-25 and in particular 0-20 mol % of groups reactive toward isocyanate,
(d) 0-10, preferably 0-5, particularly preferably 0-3 and in particular 0-2 mol % of groups reactive toward isocyanate,
(e) 0-5, preferably 0-4, particularly preferably 0-3 and in particular 0-2 mol % of groups reactive toward isocyanate,
with the proviso that the sum of the groups reactive toward isocyanate corresponds to the number of isocyanate groups in (a).

The formation of the adduct of compound containing isocyanate groups and of the compound which comprises groups reactive toward isocyanate groups is effected as a rule by mixing the components in any desired order, if appropriate at elevated temperature.

The compound which comprises groups reactive toward isocyanate groups is preferably added to the compound containing isocyanate groups, preferably in a plurality of steps.

Particularly preferably, the compound containing isocyanate groups is initially taken and the compounds which comprise groups reactive toward isocyanate are added. In particular, the compound (a) containing isocyanate groups is initially taken and then (b1) and/or (b2), preferably (b1), is added. Thereafter, desired further components can, if appropriate, be added.

As a rule, the reaction is carried out at temperatures of from 5 to 100° C., preferably from 20 to 90° C. and particularly preferably from 40 to 80° C. and in particular from 60 to 80° C.

Anhydrous conditions are preferably employed.

Anhydrous means that the water content in the reaction system is not more than 5% by weight, preferably not more than 3% by weight and particularly preferably not more than 1% by weight, very particularly preferably not more than 0.75 and in particular not more than 0.5% by weight.

The reaction is preferably carried out in the presence of at least one oxygen-containing gas, e.g. air or air/nitrogen mixtures or mixtures of oxygen or an oxygen-containing gas with a gas which is inert under the reaction conditions, which mixtures have an oxygen content of less than 15, preferably less than 12, particularly preferably less than 10, very particularly preferably less than 8 and in particular less than 6% by volume.

The reaction can also be carried out in the presence of an inert solvent, e.g. acetone, isobutyl methyl ketone, toluene, xylene, butyl acetate, methoxypropyl acetate or ethoxyethyl acetate. However, the reaction is preferably carried out in the absence of a solvent.

In a preferred embodiment, the reaction of (a) with (b1) and/or (b2), preferably (a) and (b1), is carried out under allophanatization conditions.

In a further preferred embodiment, compounds such as those described in WO 00/39183, page 4, line 3 to page 10, line 19 are used, the disclosure of which is herewith incorporated by reference. Particularly preferred among these are those compounds which have, as components, at least one (cyclo)aliphatic isocyanate having allophanate groups and at least one hydroxyalkyl (meth)acrylate, very particularly preferably product No. 1 to 9 in table 1 on page 24 of WO 00/39183.

The polyurethanes according to the invention can be used for the coating of various substrates, such as, for example, wood, wood veneer, paper, board, cardboard, textile, leather, nonwovens, plastics surfaces, glass, ceramic, mineral building materials, metals or coated metals.

When used in coating materials, the polyurethanes according to the invention can be employed in particular in primers, fillers, pigmented top coats and clear coats in the area of automotive repair coating and the coating of large vehicles. Such coating materials are particularly suitable for applications in which particularly high application reliability, outdoor weather resistance, appearance, solvent resistance, resistance to chemicals and water resistance are required, such as in automotive repair coating and the coating of large vehicles.

The present invention furthermore relates to radiation-curable coating materials comprising
at least one polyurethane according to the invention,
if appropriate, at least one compound having one or more than one double bond capable of free radical polymerization,
if appropriate, at least one photoinitiator and
if appropriate, further additives typical of coatings.

The polyurethanes according to the invention can be used as the sole binder or in combination with a further compound capable of free radical polymerization.

Compounds having one or more than one double bond capable of free radical polymerization are, for example, those compounds which have from 1 to 6, preferably from 1 to 4 and particularly preferably from 1 to 3 groups capable of free radical polymerization.

Groups capable of free radical polymerization are, for example, vinyl ether or (meth)acrylate groups, preferably (meth)acrylate groups and particularly preferably acrylate groups.

Compounds capable of free radical polymerization are frequently divided into monofunctional (compound having one double bond capable of free radical polymerization) and polyfunctional (compound having more than one double bond capable of free radical polymerization) polymerizable compounds.

Monofunctional, polymerizable compounds are those having exactly one group capable of free radical polymerization, and polyfunctional, polymerizable compounds are those having more than one, preferably having at least two, groups capable of free radical polymerization.

Monofunctional, polymerizable compounds are, for example, esters of (meth)acrylic acid with alcohols which have 1 to 20 carbon atoms, e.g. methyl (meth)acrylate, ethyl (meth)acrylate, butyl (meth)acrylate, 2-ethylhexyl(meth)acrylate, 2-hydroxyethyl(meth)acrylate, 2-hydroxypropyl (meth)acrylate, 4-hydroxybutyl(meth)acrylate, or dihydrodicyclopentadienyl acrylate, vinylaromatic compounds, e.g. styrene or divinylbenzene, α,β-unsaturated nitriles, e.g. acrylonitrile or methacrylonitrile, α,β-unsaturated aldehydes, e.g. acrolein or methacrolein, vinyl esters, e.g. vinyl acetate or vinyl propionate, halogenated ethylenically unsaturated compounds, e.g. vinyl chloride or vinylidene chloride, conjugated unsaturated compounds, e.g. butadiene, isoprene or chloroprene, monounsaturated compounds, e.g. ethylene, propylene, 1-butene, 2-butene or isobutene, cyclic monounsaturated compounds, e.g. cyclopentene, cyclohexene or cyclododecene, N-vinylformamide, allylacetic acid, vinylacetic acid, monoethylenically unsaturated carboxylic acids having 3 to 8 carbon atoms and the water-soluble alkali metal, alkaline earth metal or ammonium salts thereof, such as, for example, acrylic acid, methacrylic acid, dimethylacrylic acid, ethacrylic acid, maleic acid, citraconic acid, methylenemalonic acid, crotonic acid, fumaric acid, mesaconic acid and itaconic acid, maleic acid, N-vinylpyrrolidone, N-vinyllactams, such as, for example, N-vinylcaprolactam, N-vinyl-N-alkylcarboxamides or N-vinylcarboxamides, such as, for example, N-vinylacetamide, N-vinyl-N-methylformamide and N-vinyl-N-methylacetamide, or vinyl ethers, e.g. methyl vinyl ether, ethyl vinyl ether, n-propyl vinyl ether, isopropyl vinyl ether, n-butyl vinyl ether, sec-butyl vinyl ether, isobutyl vinyl ether, tert-butyl vinyl ether or 4-hydroxybutyl vinyl ether, and mixtures thereof.

Preferred among these are the esters of (meth)acrylic acid, particularly preferably methyl (meth)acrylate, ethyl (meth)acrylate, n-butyl (meth)acrylate, 2-ethylhexyl(meth)acrylate and 2-hydroxyethyl acrylate, very particularly preferably n-butyl(meth)acrylate, 2-ethylhexyl(meth)acrylate and 2-hydroxyethyl acrylate and in particular 2-hydroxyethyl acrylate.

In this document, (meth)acrylic acid is methacrylic acid and acrylic acid, preferably acrylic acid.

Polyfunctional, polymerizable compounds are preferably polyfunctional (meth)acrylates which carry more than 1, preferably 2-10, particularly preferably 2-6, very particularly preferably 2-4 and in particular 2-3 (meth)acrylate groups, preferably acrylate groups.

These may be, for example, esters of (meth)acrylic acid with, accordingly, at least dihydric polyalcohols.

Suitable polyalcohols of that kind are, for example, at least dihydric polyols, polyetherols or polyesterols or polyacrylate-polyols having an average OH functionality of at least 2, preferably from 3 to 10.

Examples of polyfunctional, polymerizable compounds are ethylene glycol diacrylate, 1,2-propanediol diacrylate, 1,3-propanediol diacrylate, 1,4-butanediol diacrylate, 1,3-butanediol diacrylate, 1,5-pentanediol diacrylate, 1,6-hexanediol diacrylate, 1,8-octanediol diacrylate, neopentylglycol diacrylate, 1,1-, 1,2-, 1,3- and 1,4-cyclohexanedimethanol diacrylate, 1,2-, 1,3- or 1,4-cyclohexanediol diacrylate, trimethylolpropane triacrylate, ditrimethylolpropane penta- or hexaacrylate, pentaerythrityl tri- or tetraacrylate, glyceryl di- or triacrylate and di- or polyacrylates of sugar alcohols, such as, for example, sorbitol, mannitol, diglycerol, threitol, erythritol, adonitol (ribitol), arabitol (lyxitol), xylitol, dulcitol (galactitol), maltitol or isomalt, or of polyesterpolyols, polyetherols, poly-THF having a molar mass of from 162 to 2000, poly-1,3-propanediol having a molar mass of from 134 to 1178, polyethylene glycol having a molar mass of from 106 to 898, and epoxy(meth)acrylates, urethane (meth)acrylates and polycarbonate (meth)acrylates.

Further examples are (meth)acrylates of compounds of the formulae (VIIIa) to (VIIIc),

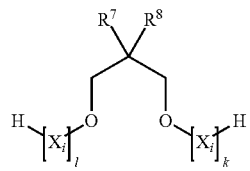

(VIIIa)

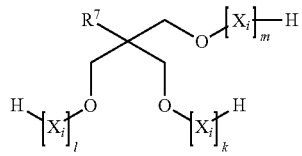

(VIIIb)

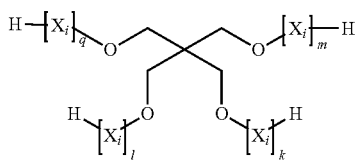

(VIIIc)

where
$R^7$ and $R^8$, independently of one another, are hydrogen or $C_1$-$C_{18}$-alkyl, optionally substituted by aryl, alkyl, aryloxy, alkoxy, hetero atoms and/or heterocycles,
k, l, m and q, independently of one another, are each an integer from 1 to 10, preferably from 1 to 5 and particularly preferably from 1 to 3 and
each $X_i$, if i=1 to k, 1 to l, 1 to m and 1 to q, independently of one another, may be selected from the group consisting of —$CH_2$—$CH_2$—O—, —$CH_2$—$CH(CH_3)$—O—, —$CH(CH_3)$—$CH_2$—, —$CH_2$—$C(CH_3)_2$—O—, —$C(CH_3)_2$—$CH_2$—O—, —$CH_2$—CHVin-O—, —CHVin-$CH_2$—O—, —$CH_2$—CHPh-O— and —CHPh-$CH_2$—O—, preferably from the group consisting of —$CH_2$—$CH_2$—O—, —$CH_2$—$CH(CH_3)$—O— and —$CH(CH_3)$—$CH_2$—O—, and particularly preferably —$CH_2$—$CH_2$—O—,
where Ph is phenyl and Vin is vinyl.

Therein, $C_1$-$C_{18}$-alkyl optionally substituted by aryl, alkyl, aryloxy, alkoxy, hetero atoms and/or heterocycles is, for example, methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, heptadecyl, octadecyl, 1,1-dimethylpropyl, 1,1-dimethylbutyl, 1,1,3,3-tetramethylbutyl, preferably methyl, ethyl or n-propyl, very particular preferably methyl or ethyl.

They are preferably (meth)acrylates of neopentylglycol, trimethylolpropane, trimethylolethane or pentaerythritol which has a degree of ethoxylation, propoxylation or mixed ethoxylation and propoxylation of one to twenty and particularly preferably from three to ten and in particular which is exclusively ethoxylated.

Preferred polyfunctional, polymerizable compounds are ethylene glycol diacrylate, 1,2-propanediol diacrylate, 1,3-propanediol diacrylate, 1,4-butanediol diacrylate, 1,6-hexanediol diacrylate, trimethylolpropane triacrylate, pentaerythrityl tetraacrylate, polyesterpolyol acrylates, polyetherol acrylates and the triacrylate of trimethylolpropane which has a degree of alkoxylation of from one to twenty, particularly preferably of ethoxylated trimethylolpropane.

Very particularly preferred polyfunctional, polymerizable compounds are 1,4-butanediol diacrylate, 1,6-hexanediol diacrylate, trimethylolpropane triacrylate, pentaerythrityl tetraacrylate and the triacrylate of trimethylolpropane having a degree of ethoxylation of from one to twenty.

Polyesterpolyols are known, for example, from Ullmanns Encyklopädie der technischen Chemie, 4th Edition, Volume 9, pages 62 to 65. Polyesterpolyols which are obtained by reacting dihydric alcohols with dibasic carboxylic acids are preferred. Instead of the free polycarboxylic acids, it is also possible to use the corresponding polycarboxylic anhydrides or corresponding polycarboxylic esters of lower alcohols or mixtures thereof for the preparation of the polyesterpolyols. The polycarboxylic acids may be aliphatic, cycloaliphatic, araliphatic, aromatic or heterocyclic and may be optionally substituted, for example by halogen atoms, and/or unsaturated. The following may be mentioned as examples of these: oxalic acid, maleic acid, fumaric acid, succinic acid, glutaric acid, adipic acid, sebacic acid, dodecanedioic acid, o-phthalic acid, isophthalic acid, terephthalic acid, trimellitic acid, azelaic acid, 1,4-cyclohexanedicarboxylic acid or tetrahydrophthalic acid, suberic acid, phthalic anhydride, tetrahydrophthalic anhydride, hexahydrophthalic anhydride, tetrachlorophthalic anhydride, endomethylenetetrahydrophthalic anhydride, glutaric anhydride, maleic anhydride, dimeric fatty acids, the isomers and hydrogenation products thereof and esterifiable derivatives, such as anhydrides or dialkyl esters, for example $C_1$-$C_4$-alkyl esters, preferably methyl, ethyl or n-butyl esters, of said acids. Dicarboxylic acids of the general formula HOOC—$(CH_2)_y$—COOH, where y is a number from 1 to 20, preferably an even number from 2 to 20, are preferred, particularly preferably succinic acid, adipic acid, sebacic acid and dodecanedicarboxylic acid.

Suitable polyhydric alcohols for the preparation of the polyesterols are 1,2-propanediol, ethylene glycol, 2,2-dimethyl-1,2-ethanediol, 1,3-propanediol, 1,2-butanediol, 1,3-butanediol, 1,4-butanediol, 3-methylpentane-1,5-diol, 2-ethylhexane-1,3-diol, 2,4-diethyloctane-1,3-diol, 1,6-hexanediol, poly-THF having a molar mass of from 162 to 2000, poly-1,3-propanediol having a molar mass of from 134 to 1178, poly-1,2-propanediol having a molar mass of from 134 to 898, polyethylene glycol having a molar mass of from 106 to 458, neopentylglycol, neopentylglycol hydroxypivalate, 2-ethyl-1,3-propanediol, 2-methyl-1,3-propanediol, 2,2-bis(4-hydroxycyclohexyl)propane, 1,1-, 1,2-, 1,3- and 1,4-cyclohexanedimethanol, 1,2-, 1,3- or 1,4-cyclohexanediol, trimethylolbutane, trimethylolpropane, trimethylolethane, neopentylglycol, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol or isomalt, which, if appropriate, may be alkoxylated as described above.

Alcohols of the general formula HO—$(CH_2)_x$—OH, where x is a number from 1 to 20, preferably an even number from 2 to 20, are preferred. Ethylene glycol, butane-1,4-diol, hexane-1,6-diol, octane-1,8-diol and dodecane-1,12-diol are preferred. Neopentylglycol is furthermore preferred.

Polycarbonate-diols, as may be obtained, for example, by reacting phosgene with an excess of the lower molecular weight alcohols mentioned as components for the polyesterpolyols are also suitable.

Lactone-based polyesterdiols are also suitable, these being homo- or copolymers of lactones, preferably those adducts of lactones with suitable difunctional initiator molecules which have terminal hydroxyl groups. Preferred lactones are those which are derived from compounds of the general formula HO—$(CH_2)_z$—COOH, where z is a number from 1 to 20 and a hydrogen atom of a methylene unit may also be substituted by a $C_1$- to $C_4$-alkyl radical. Examples are ε-caprolactone, β-propiolactone, gamma-butyrolactone and/or methyl-ε-caprolactone, 4-hydroxybenzoic acid, 6-hydroxy-2-naphthalenic acid or pivalolactone and mixtures thereof. Suitable initiator components are, for example, the low molecular weight dihydric alcohols mentioned above as a component for the polyesterpolyols. The corresponding polymers of ε-caprolactone are particularly preferred. Lower polyesterdiols or polyetherdiols can also be used as initiators for the preparation of the lactone polymers. Instead of the polymers of lactones, it is also possible to use the corresponding, chemically equivalent polycondensates of the hydroxycarboxylic acids corresponding to the lactones. Furthermore, the polyfunctional, polymerizable compound may be a urethane (meth)acrylate, epoxy(meth)acrylate or carbonate(meth)acrylate.

Urethane (meth)acrylates are obtainable, for example, by reacting polyisocyanates with hydroxyalkyl(meth)acrylates or hydroxyalkyl vinyl ethers and, if appropriate, chain extenders, such as diols, polyols, diamines, polyamines or dithiols or polythiols. Urethane (meth)acrylates dispersible in water without addition of emulsifiers additionally comprise ionic and/or nonionic hydrophilic groups which, for example, are introduced into the urethane by components such as hydroxycarboxylic acids.

Such urethane (meth)acrylates substantially comprise as components:
(a) at least one organic aliphatic, aromatic or cycloaliphatic di- or polyisocyanate,
(b) at least one compound having at least one group reactive toward isocyanate and at least one unsaturated group capable of free radical polymerization and
(c) if appropriate, at least one compound having at least two groups reactive toward isocyanate.

The components (a), (b) and (c) may be the same as those described above for the polyurethanes according to the invention.

The urethane (meth)acrylates preferably have a number average molecular weight $M_n$ of from 500 to 20 000, in particular from 500 to 10 000, particularly preferably from 600 to 3000, g/mol (determined by gel permeation chromatography using tetrahydrofuran and polystyrene as a standard).

The urethane (meth)acrylates preferably have a content of from 1 to 5, particularly preferably from 2 to 4, mol of (meth)acrylate groups per 1000 g of urethane (meth)acrylate.

Epoxide (meth)acrylates are obtainable by reacting epoxides with (meth)acrylic acid. Suitable epoxides are, for example, epoxidized olefins, aromatic glycidyl ethers or aliphatic glycidyl ethers, preferably those of aromatic or aliphatic glycidyl ethers.

Epoxidized olefins may be, for example, ethylene oxide, propylene oxide, isobutylene oxide, 1-butene oxide, 2-butene oxide, vinyloxirane, styrene oxide or epichlorohydrin, preferably ethylene oxide, propylene oxide, isobutylene oxide, vinyloxirane, styrene oxide or epichlorohydrin, particularly preferably ethylene oxide, propylene oxide or epichlorohydrin and very particularly preferably ethylene oxide and epichlorohydrin.

Aromatic glycidyl ethers are, for example, bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g. 2,5-bis[(2,3-epoxypropoxy)phenyl]octahydro-4,7-methano-5H-indene (CAS No. [13446-85-0]), tris[4-(2,3-epoxypropoxy)phenyl]methane isomers (CAS No. [66072-39-7]), phenol-based epoxy novolaks (CAS No. [9003-35-4]) and cresol-based epoxy novolaks (CAS No. [37382-79-9]).

Aliphatic glycidyl ethers are, for example, 1,4-butanediol diglycidyl ether, 1,6-hexanediol diglycidyl ether, trimethylolpropane triglycidyl ether, pentaerythrityl tetraglycidyl ether, 1,1,2,2-tetrakis[4-(2,3-epoxypropoxy)phenyl]ethane (CAS No. [27043-37-4]), diglycidyl ether of polypropylene glycol (α,ω-bis(2,3-epoxypropoxy)poly(oxypropylene) (CAS No. [16096-30-3]) and of hydrogenated bisphenol A (2,2-bis[4-(2,3-epoxypropoxy)cyclohexyl]propane (CAS No. [13410-58-7]).

The epoxide (meth)acrylates and epoxide vinyl ethers preferably have a number average molecular weight $M_n$ of from 200 to 20 000, particularly preferably from 200 to 10 000, g/mol and very particularly preferably from 250 to 3000 g/mol; the content of (meth)acryloyl or vinyl ether groups is preferably from 1 to 5, particularly preferably from 2 to 4, per 1000 g of epoxide (meth)acrylate or vinyl ether epoxide (determined by gel permeation chromatography using polystyrene as a standard and tetrahydrofuran as an eluent).

Carbonate (meth)acrylates comprise on average preferably from 1 to 5, in particular from 2 to 4, particularly preferably 2 or 3, (meth)acryloyl groups and very particularly preferably 2 (meth)acryloyl groups.

The number average molecular weight $M_n$ of the carbonate (meth)acrylates is preferably less than 3000 g/mol, particularly preferably less than 1500 g/mol, particularly preferably less than 800 g/mol (determined by gel permeation chromatography using polystyrene as a standard and tetrahydrofuran as a solvent).

The carbonate (meth)acrylates are obtainable in a simple manner by transesterification of carbonic esters with polyhydric, preferably dihydric, alcohols (diols, e.g. hexanediol) and then esterifying the free OH groups with (meth)acrylic acid or by transesterification with (meth)acrylic esters, as described, for example, in EP-A 92 269. They are also obtainable by reacting phosgene or urea derivatives with polyhydric, e.g. dihydric, alcohols.

Vinyl ether carbonates are also obtainable in an analogous manner by reacting hydroxyalkyl vinyl ether with carbonic esters and, if appropriate, dihydric alcohols.

(Meth)acrylates or vinyl ethers of polycarbonate polyols, such as the reaction product of one of said di- or polyols and a carbonic ester and a (meth)acrylate or vinyl ether containing hydroxyl groups, are also conceivable.

Suitable carbonic esters are, for example, ethylene carbonate, 1,2- or 1,3-propylene carbonate or dimethyl, diethyl or dibutyl carbonate.

Suitable (meth)acrylates containing hydroxyl groups are, for example, 2-hydroxyethyl(meth)acrylate, 2- or 3-hydroxypropyl(meth)acrylate, 1,4-butanediol mono(meth)acrylate, neopentylglycol mono(meth)acrylate, glyceryl mono- and di(meth)acrylate, trimethylolpropane mono- and di(meth) acrylate and pentaerythrityl mono-, di- and tri(meth)acrylate.

Suitable vinyl ethers containing hydroxyl groups are, for example, 2-hydroxyethyl vinyl ether and 4-hydroxybutyl vinyl ether.

Particularly preferred carbonate (meth)acrylates are those of the formula

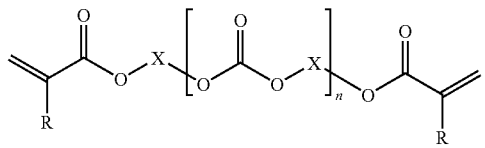

where R is H or $CH_3$, X is a $C_2$-$C_{18}$-alkylene group and n is an integer from 1 to 5, preferably from 1 to 3.

R is preferably H and X is preferably $C_2$- to $C_{1-10}$-alkylene, for example 1,2-ethylene, 1,2-propylene, 1,3-propylene, 1,4-butylene or 1,6-hexylene, particularly preferably $C_4$- to $C_8$-alkylene. Very particularly preferably, X is $C_6$-alkylene.

The carbonate (meth)acrylates are preferably aliphatic carbonate (meth)acrylates.

Among the polyfunctional, polymerizable compounds, urethane (meth)acrylates are particularly preferred.

The present invention furthermore relates to a radiation-curable coating material comprising
    at least one polyurethane according to the invention which comprises free isocyanate groups,
    at least one compound having one or more than one double bond capable of free radical polymerization,
    if appropriate, at least one photoinitiator,
    at least one compound having more than one hydroxyl and/or amino group,
    if appropriate, at least one compound having a hydroxyl or amino group,
    if appropriate, at least one organometallic tin compound or at least one cesium compound and
    if appropriate, further additives typical of coatings.

Photoinitiators may be, for example, photoinitiators known to a person skilled in the art, for example those mentioned in "Advances in Polymer Science", Volume 14, Springer Berlin 1974, or in K. K. Dietliker, Chemistry and Technology of UV- and EB-Formulation for Coatings, Inks and Paints, Volume 3; Photoinitiators for Free Radical and Cationic Polymerization, P. K. T. Oldring (Eds), SITA Technology Ltd, London.

For example, mono- or bisacylphosphine oxides, as described, for example, in EP-A 7 508, EP-A 57 474, DE-A 196 18 720, EP-A 495 751 or EP-A 615 980, are suitable, for example 2,4,6-trimethylbenzoyldiphenylphosphine oxide (Lucirin® TPO from BASF AG), ethyl-2,4,6-trimethylbenzoylphenylphosphinate (Lucirin® TPO L from BASF AG), bis(2,4,6-trimethylbenzoyl)phenylphosphine oxide (Irgacure® 819 from Ciba Spezialitätenchemie), benzophenones, hydroxyacetophenones, phenylglyoxylic acid and its derivatives or mixtures of these photoinitiators. Benzophenone, acetophenone, acetonaphthoquinone, methyl ethyl ketone, valerophenone, hexanophenone, α-phenylbutyrophenone, p-morpholinopropiophenone, dibenzosuberone, 4-morpholinobenzophenone, 4-morpholinodeoxybenzoin, p-diacetylbenzene, 4-aminobenzophenone, 4'-methoxyacetophenone, β-methylanthraquinone, tert-butylanthraquinone, anthraquinonecarboxylic acid esters, benzaldehyde, α-tetralone, 9-acetylphenanthrene, 2-acetylphenanthrene, 10-thioxanthenone, 3-acetylphenanthrene, 3-acetylindole, 9-fluorenone, 1-indanone, 1,3,4-triacetylbenzene, thioxanthen-9-one, xanthen-9-one, 2,4-dimethylthioxanthone, 2,4- diethylthioxanthone, 2,4-diisopropylthioxanthone, 2,4-dichlorothioxanthone, benzoin, benzoin isobutyl ether, chloroxanthenone, benzoin tetrahydropyranyl ether, benzoin methyl ether, benzoin ethyl ether, benzoin butyl ether, benzoin isopropyl ether, 7H-benzoin methyl ether, benz[de]anthracen-7-one, 1-naphthaldehyde, 4,4'-bis(dimethylamino)benzophenone, 4-phenylbenzophenone, 4-chlorobenzophenone, Michler's ketone, 1-acetonaphthone, 2-acetonaphthone, 1-benzoylcyclohexan-1-ol, 2-hydroxy-2,2-dimethylacetophenone, 2,2-dimethoxy-2-phenylacetophenone, 2,2-diethoxy-2-phenylacetophenone, 1,1-dichloroacetophenone, 1-hydroxyacetophenone, acetophenone dimethyl ketal, o-methoxybenzophenone, triphenylphosphine, tri-o-tolylphosphine, benz[a]anthracene-7,12-dione, 2,2-diethoxyacetophenone, benzil ketals, such as benzil dimethyl ketal, 2-methyl-1-[4-(methylthio)phenyl]-2-morpholinopropan-1-one, anthraquinones, such as 2-methylanthraquinone, 2-ethylanthraquinone, 2-tert-butylanthraquinone, 1-chloroanthraquinone, 2-amylanthraquinone and 2,3-butanedione may be mentioned as examples.

Nonyellowing or slightly yellowing photoinitiators of the phenylglyoxalic acid ester type, as described in DE-A 198 26 712, DE-A 199 13 353 or WO 98/33761, are also suitable.

Preferred among these photoinitiators are 2,4,6-trimethylbenzoyldiphenylphosphine oxide, ethyl-2,4,6-trimethylbenzoylphenylphosphinate, bis(2,4,6-trimethylbenzoyl)-phenylphosphine oxide, benzophenone, 1-benzoylcyclohexan-1-ol, 2-hydroxy-2,2-dimethylacetophenone and 2,2-dimethoxy-2-phenylacetophenone.

Compounds having more than one hydroxyl and/or amino group are, for example, the abovementioned polyesterols, polyetherols or polyacrylatepolyols.

Polyamines are furthermore suitable. Amines suitable for this purpose are in general polyfunctional amines of the molecular weight range from 32 to 500 g/mol, preferably from 60 to 300 g/mol, which comprise at least two primary amino groups, two secondary amino groups or one primary and one secondary amino group. Examples of these are diamines, such as diaminoethane, diaminopropanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine or hydrazine hydrate, or triamines, such as diethylenetriamine or 1,8-diamino-4-aminomethyloctane, or higher amines, such as triethylentetramine or tetraethylenepentamine, or polymeric amines, such as polyethyleneamines, hydrogenated polyacrylonitriles or at least partly hydrolyzed poly-N-vinylformamides, in each case having a molecular weight of up to 2000, preferably up to 1000, g/mol.

Furthermore, compounds having a hydroxyl or amino group may be used in minor amounts for chain termination. These serve mainly for limiting the molecular weight. Examples of monoalcohols are methanol, ethanol, isopropanol, n-propanol, n-butanol, isobutanol, sec-butanol, tert-butanol, ethylene glycol monomethyl ether, ethylene glycol monoethyl ether, 1,3-propanediol monomethyl ether, n-hexanol, n-heptanol, n-octanol, n-decanol, n-dodecanol (lauryl alcohol) and 2-ethylhexanol. Examples of monoamines are methylamine, ethylamine, isopropylamine, n-propylamine, n-butylamine, isobutyl-amine, sec-butylamine, tert-butylamine, n-pentylamine, n-hexylamine, n-heptylamine, n-octylamine, n-decylamine, n-dodecylamine, 2-ethylhexylamine, stearylamine, cetylamine or laurylamine.

For example, antioxidants, stabilizers, activators (accelerators), fillers, pigments, dyes, antistatic agents, flameproofing agents, thickeners, thixotropic agents, surface-active agents, viscosity modifiers, plasticizers or chelating agents may be used as further additives typical of coatings.

It is furthermore possible to add one or more thermally activatable initiators, e.g. potassium peroxodisulfate, dibenzoyl peroxide, cyclohexanone peroxide, di-tert-butyl peroxide, azobisisobutyronitrile, cyclohexylsulfonyl acetyl peroxide, diisopropyl percarbonate, tert-butyl peroctanoate or benzpinacol, and, for example, those thermally activatable initiators which have a half-life of more than 100 hours at 80° C., such as di-tert-butyl peroxide, cumyl hydroperoxide, dicumyl peroxide, tert-butyl perbenzoate, silylated pinacols, which are commercially available, for example, under the trade name ADDID 600 from Wacker, or amine N-oxides containing hydroxyl groups, such as 2,2,6,6-tetramethylpiperidine-N-oxyl, 4-hydroxy-2,2,6,6-tetramethylpiperidin-N-oxyl, etc.

Further examples of suitable initiators are described in "Polymer Handbook", 2nd Edition, Wiley & Sons, New York.

Suitable thickeners in addition to (co)polymers capable of free radical (co)polymerization are conventional organic and inorganic thickeners, such as hydroxymethylcellulose or bentonite.

Chelating agents which may be used are, for example, ethylenediamineacetic acid and salts thereof and β-diketones.

Suitable fillers comprise silicates, for example silicates obtainable by hydrolysis of silicon tetrachloride, such as Aerosil® from Degussa, silica, talc, aluminum silicates, magnesium silicates, calcium carbonates, etc.

Suitable stabilizers comprise typical UV absorbers, such as oxanilides, triazines and benzotriazole (the latter obtainable as Tinuvin® grades from Ciba-Spezialitätenchemie) and benzophenones. These can be used alone or together with suitable free radical scavengers, for example sterically hindered amines, such as 2,2,6,6-tetramethyl-piperidine, 2,6-di-tert-butylpiperidine or derivatives thereof, e.g. bis(2,2,6,6-tetramethyl-4-piperidyl) sebacinate. Stabilizers are usually used in amounts of from 0.1 to 5.0% by weight, based on the solid components which the formulation comprises.

The coating of the substrates with the coating materials according to the invention is effected by conventional methods known to a person skilled in the art, a coating material according to the invention or a coating formulation comprising said coating material being applied in the desired thickness to the substrate to be coated and, if appropriate, being dried. This operation can, if desired, be repeated once or several times. The application to the substrate can be effected in a known manner, for example by spraying, filling, knife-coating, brushing, applying with a hard or rubber-coated roller, pouring, laminating, back injection or coextrusion. The application of the coating material can also be effected electrostatically in the form of powder (powder coatings). The coat thickness is as a rule in a range from about 3 to 1000 g/m² and preferably from 10 to 200 g/m².

Furthermore, a process for the coating of substrates is disclosed, in which, if appropriate, further additives typical of coatings and heat-curable, chemically curable or radiation-curable resins are added to the coating material according to the invention or to a coating formulation comprising such material, said coating material or said formulation is applied to the substrate and, if appropriate, dried, cured by means of electron beams or exposure to UV light under an oxygen-containing atmosphere or preferably under inert gas, if appropriate at temperatures up to the level of the drying temperature, and then thermally treated at temperatures up to 160° C., preferably from 60 to 160° C.

The radiation curing is effected using high-energy light, e.g. UV light or electron beams. The radiation curing can be effected at relatively high temperatures. A temperature above the $T_g$ of the radiation-curable binder is preferred.

Here, radiation curing means the free radical polymerization of polymerizable compounds by means of electromagnetic and/or corpuscular radiation, preferably UV light in the wavelength range of $\lambda=200$ to 700 nm and/or electron beams in the range from 150 to 300 keV and particularly preferably with a radiation dose of at least 80, preferably from 80 to 3000, mJ/cm$^2$.

In addition to radiation curing, further curing mechanisms may also be involved, for example heat curing, moisture curing, chemical curing and/or oxidative curing.

The coating material can be applied once or several times by a very wide range of spray methods, such as, for example, compressed-air, airless or electrostatic spraying methods using one- or two-component spray units, but also by spraying, filling, knife-coating, brushing, application with a hard or rubber-coated roller, pouring, lamination, back injection or coextrusion.

The coat thickness is as a rule in a range from about 3 to 1000 g/m$^2$ and preferably from 10 to 200 g/m$^2$.

The drying and curing of the coatings is effected in general under normal temperature conditions, i.e. without heating of the coating. However, the mixtures according to the invention can also be used for the production of coatings which, after application, are dried at elevated temperature, for example at 40-250° C., preferably 40-150° C. and in particular at 40 to 100° C. and cured. This is limited by the thermal stability of the substrate.

Furthermore, a process for coating substrates is disclosed in which, if appropriate, heat-curable resins are added to the coating material according to the invention or to coating formulations comprising said coating material, and said coating material or said formulation is applied to the substrate, dried, and then cured by means of electron beams or exposure to UV light under an oxygen-containing atmosphere or preferably under inert gas, if appropriate at temperatures up to the level of the drying temperature.

The process for coating substrates can also be carried out in such a way that, after application of the coating material or coating formulations according to the invention, first exposure to electron beams or UV light under oxygen or preferably under inert gas is effected in order to achieve preliminary curing, thermal treatment is then effected at temperatures up to 160° C., preferably from 60 to 160° C., and then final curing by means of electron beams or exposure to UV light under oxygen or preferably under inert gas is effected.

If appropriate, if a plurality of layers of the coating material are applied one on top of the other, drying and/or radiation curing can be effected after each coating operation.

Suitable radiation sources for the radiation curing are, for example, low-pressure mercury lamps, medium-pressure mercury lamps with high-pressure lamps and fluorescent tubes, pulsed lamps, metal halide lamps, electronic flash means, with the result that radiation curing is possible without a photoinitiator, or excimer lamps. The radiation curing is effected by the action of high-energy radiation, i.e. UV radiation or daylight, preferably light in the wavelength range of $\lambda=200$ to 700 nm, particularly preferably of $\lambda=200$ to 500 nm and very particularly preferably $\lambda=250$ to 400 nm, or by exposure to high-energy electrons (electron beams; from 150 to 300 keV). Radiation sources used are, for example, high-pressure mercury vapor lamps, lasers, pulsed lamps (flashlight), halogen lamps or excimer lamps. The radiation dose usually sufficient for the crosslinking in the case of UV radiation is in the range from 80 to 3000 mJ/cm$^2$.

Of course, a plurality of radiation sources may also be used for the curing, for example from two to four.

These can also emit in the respective different wavelength ranges.

The drying and/or thermal treatment can also be effected in addition to or instead of the thermal treatment by NIR radiation, NIR radiation being defined here as electromagnetic radiation in the wavelength range from 760 nm to 2.5 µm, preferably from 900 to 1500 nm.

The irradiation can, if appropriate, also be carried out in the absence of oxygen, for example under an inert gas atmosphere. Suitable inert gases are preferably nitrogen, noble gases, carbon dioxide or combustion gases. Furthermore, the irradiation may be effected by covering the coating material with transparent media. Transparent media are, for example, plastics films, glass or liquids, e.g. water. Irradiation in the manner described in DE-A1 199 57 900 is particularly preferred.

If crosslinking agents which result in additional thermal crosslinking, e.g. isocyanates, are also comprised, for example, the thermal crosslinking can be carried out simultaneously or after the radiation curing, by increasing the temperature to 150° C., preferably to 130° C.

The polyurethanes according to the invention have high scratch resistance, which is also evident in high gloss after being subjected to mechanical stress. If lower requirements regarding the scratch resistance are set, it is possible, alternatively or additionally, to adjust the flexibility to the desired value by the choice of the component (c).

A further advantage is that an overspray resulting during the application of the radiation-curable coating material can be virtually completely recycled and used again, whereas a dual-cure coating material has only limited possibilities for recycling, owing to the limited pot life.

ppm and percentage data used in this document relate to percentages by weight and ppm by weight, unless stated otherwise.

The examples which follow are intended to illustrate the invention but not to restrict it to these examples.

EXAMPLES

A polyisocyanate containing allophanate groups was prepared from hexamethylene 1,6-diisocyanate and 2-hydroxyethyl acrylate analogously to example 1 of WO 00/39183 as the polyisocyanate in the following examples, so that a polyisocyanate having an NCO content, after distillative separation of the unconverted monomeric hexamethylene 1,6-diisocyanate, of 15.1% by weight (residual monomer content <0.5% by weight), a viscosity of 940 mPa·s at 23° C., an average molecular weight of about 800 g/mol and a double bond density, determined by means of $^1$H-NMR, of 2 mol/kg was obtained.

Example 1

In a three-necked flask having a reflux condenser and stirrer, 54.54 g of polyisocyanate containing allophanate groups, 113.35 g of pentaerythrityl tri/tetraacrylate (commercial product from UCB, OH number=99 mg KOH/g), 0.08 g of methylhydroquinone and 0.17 g of 2,6-di-tert-butyl-p-cresol were mixed at room temperature. 0.03 g of dibutyltin dilaurate was added as a catalyst. The reaction mixture was stirred for 15 h at 70° C. until the NCO value of the reaction mixture was 0.08%.

Example 2

In a three-necked flask having a reflux condenser and stirrer, 354.54 g of polyisocyanate containing allophanate groups, 607.84 g of Sartomer® SR444D (commercial product from CrayValley Sartomer, pentaerythrityl tri/tetraacrylate mixture having an OH number of 120 mg KOH/g), 0.48 g of methylhydroquinone and 0.96 g of 2,6-di-tert-butyl-p-cresol were mixed at room temperature. 0.19 g of dibutyltin dilaurate was added as a catalyst to the thoroughly mixed initially taken mixture. A weakly exothermic reaction occurred so that the internal temperature increased to about 30° C. The reaction mixture was stirred for 8 h at 70° C. until the NCO value of the reaction mixture was 0.4%.

Example 3

In a three-necked flask having a reflux condenser and stirrer, 709.07 g of polyisocyanate containing allophanate groups, 374.76 g of hydroxypropyl methacrylate, 0.54 g of methylhydroquinone and 1.08 g of 2,6-di-tert-butyl-p-cresol were mixed at room temperature. 0.22 g of dibutyltin dilaurate was added as a catalyst to the thoroughly mixed initially taken mixture. A weakly exothermic reaction occurred so that the internal temperature increased to about 40° C. The reaction mixture was stirred for 10.5 h at 75° C. until the NCO value of the reaction mixture was 0.16%.

Example 4

In a three-necked flask having a reflux condenser and stirrer, 81.82 g of polyisocyanate containing allophanate groups, 50.00 g of CAPA® 212 (polycaprolactonediol from Solvay, OH number=112 mg KOH/g), 108.95 g of pentaerythrityl tri/tetraacrylate (commercial product from UCB, OH number=103 mg KOH/g), 0.12 g of methylhydroquinone and 0.24 g of 2,6-di-tert-butyl-p-cresol in 80.26 g of butyl acetate were mixed at room temperature. 0.10 g of dibutyltin dilaurate was added as a catalyst to the thoroughly mixed initially taken mixture. The reaction mixture was stirred for 7 h at 75-86° C. until the NCO value of the reaction mixture was 0.26%. 1 g of methanol was added in order to convert the remaining NCO groups. After stirring for a further 90 minutes at 75-85° C., an NCO value of 0% was obtained.

Example 5

In a three-necked flask having a reflux condenser and stirrer, 81.82 g of polyisocyanate containing allophanate groups, 145.74 g of CAPA® 231 (polycaprolactonediol from Solvay, OH number=38.5 mg KOH/g), 108.95 g of pentaerythrityl tri/tetraacrylate (commercial product from UCB, OH number=103 mg KOH/g), 0.17 g of methylhydroquinone and 0.34 g of 2,6-di-tert-butyl-p-cresol in 112.16 g of butyl acetate were mixed at room temperature. 0.13 g of dibutyltin dilaurate was added as a catalyst to the thoroughly mixed initially taken mixture. The reaction mixture was stirred for 6 h at 75-86° C. until the NCO value of the reaction mixture was 0.26%. 1 g of methanol was added in order to convert the remaining NCO groups and dilution was effected with 33.00 g of butyl acetate. After stirring for a further 90 minutes at 75-85° C., an NCO value of 0% was obtained.

Example 6

In a three-necked flask having a reflux condenser and stirrer, 40.91 g of polyisocyanate containing allophanate groups, 100.19 g of CAPA® 240 (polycaprolactonediol from Solvay, OH number=28 mg KOH/g), 54.47 g of pentaerythrityl tri/tetraacrylate (commercial product from UCB, OH number=103 mg KOH/g), 0.10 g of methylhydroquinone and 0.20 g of 2,6-di-tert-butyl-p-cresol in 83.82 g of butyl acetate were mixed at room temperature. 0.08 g of dibutyltin dilaurate was added as a catalyst to the thoroughly mixed initially taken mixture. The reaction mixture was stirred for 6 h at 75-86° C. until the NCO value of the reaction mixture was 0.2%. 1 g of methanol was added in order to convert the remaining NCO groups and dilution was effected with 21.49 g of butyl acetate. After stirring for a further 90 minutes at 75-85° C., an NCO value of 0% was obtained.

Example 7

In a three-necked flask having a reflux condenser and stirrer, 402.86 g of polyisocyanate containing allophanate groups, 32.18 g of butanediol, 0.41 g of methylhydroquinone and 0.82 g of 2,6-di-tert-butyl-p-cresol in 206.00 g of butyl acetate were mixed at room temperature. 0.17 g of dibutyltin dilaurate was added as a catalyst to the thoroughly mixed initially taken mixture. A weakly exothermic reaction occurred so that the internal temperature increased to about 50° C. in the course of 20 minutes. The reaction mixture was stirred for 1.5 h at 75° C. until the NCO value of the reaction mixture was 4.28%. Then followed the addition of 389.09 g of pentaerythrityl tri/tetraacrylate (commercial product from UCB, OH number=103 mg KOH/g) and 0.16 g of dibutyltin dilaurate. After stirring for 6 h at 75° C., an NCO value of 0.44% was reached. 3.50 g of methanol were added in order to convert the remaining NCO groups. After storage overnight at room temperature, an NCO value of 0% was obtained.

Example 8

In a three-necked flask having a reflux condenser and stirrer, 402.86 g of polyisocyanate containing allophanate groups, 357.14 g of PolyTHF® 1000 (polytetrahydrofuran from BASF, OH number=112.21 mg KOH/g), 0.57 g of methylhydroquinone and 1.15 g of 2,6-di-tert-butyl-p-cresol in 287.00 g of butyl acetate were mixed at room temperature. 0.30 g of dibutyltin dilaurate was added as a catalyst to the thoroughly mixed initially taken mixture. A weakly exothermic reaction occurred so that the internal temperature increased to about 40° C. in the course of 30 minutes. The reaction mixture was stirred for 1.5 h at 75° C. until the NCO value of the reaction mixture was 2.70%. Then followed the addition of 389.09 g of pentaerythrityl tri/tetraacrylate (commercial product from UCB, OH number=103 mg KOH/g) and 0.16 g of dibutyltin dilaurate. After stirring for 7 h at 75° C., an NCO value of 0.27% was reached. 3.00 g of methanol were added in order to convert the remaining NCO groups and dilution was effected with 205.00 g of butyl acetate. After storage overnight at room temperature, an NCO value of 0% was obtained.

Example 9

In a three-necked flask having a reflux condenser and stirrer, 402.86 g of polyisocyanate containing allophanate groups, 714.30 g of PolyTHF® 2000 (polytetrahydrofuran from BASF, OH number=56.11 mg KOH/g), 0.75 g of methylhydroquinone and 1.51 g of 2,6-di-tert-butyl-p-cresol were mixed at room temperature. 0.45 g of dibutyltin dilaurate was added as a catalyst to the thoroughly mixed initially taken mixture. A weakly exothermic reaction occurred so that the internal temperature increased to about 66° C. in the course of 10 minutes. The reaction mixture was diluted with 279.00 g of butyl acetate and stirred for 1.5 h at 75° C. until the NCO value of the reaction mixture was 1.90%. Then followed the addition of 389.09 g of pentaerythrityl tri/tetraacrylate (commercial product from UCB, OH number=103 mg KOH/g), 0.16 g of dibutyltin dilaurate and 223.00 g of butyl acetate. After stirring for 7 h at 75° C., an NCO value of 0.15% was reached. 2.30 g of methanol were added in order to convert the remaining NCO groups. After storage overnight at room temperature, an NCO value of 0% was obtained.

Example 10

In a three-necked flask having a reflux condenser and stirrer, 338.40 g of polyisocyanate containing allophanate groups, 300.00 g of CAPA® 212 (polycaprolactonediol from Solvay, OH number=112 mg KOH/g), 326.84 g of pentaerythrityl tri/tetraacrylate (commercial product from UCB, OH number=103 mg KOH/g), 0.48 g of methylhydroquinone and 0.97 g of 2,6-di-tert-butyl-p-cresol in 321.75 g of butyl acetate were mixed at room temperature. 0.39 g of dibutyltin dilaurate was added as a catalyst to the thoroughly mixed initially taken mixture. The reaction mixture was stirred for 6 h at 75-86° C. until the NCO value of the reaction mixture was 0.25%. 4.0 g of methanol were added in order to convert the remaining NCO groups. After stirring for a further 90 minutes at 75° C. and storage overnight at room temperature, an NCO value of 0% was obtained.

Example 11

In a three-necked flask having a reflux condenser and stirrer, 402.86 g of polyisocyanate containing allophanate groups, 42.22 g of hexanediol, 0.42 g of methylhydroquinone and 0.83 g of 2,6-di-tert-butyl-p-cresol were mixed at room temperature. 0.18 g of dibutyltin dilaurate was added as a catalyst to a thoroughly mixed initially taken mixture. A weakly exothermic reaction occurred so that the internal temperature increased to about 30° C. in the course of 20 minutes. The reaction mixture was stirred for 1.5 h at 75° C. until the NCO value of the reaction mixture was 6.55%. Then followed the addition of 389.09 g of pentaerythrityl tri/tetraacrylate (commercial product from UCB, OH number=103 mg KOH/g), 208.5 g of butyl acetate and 0.16 g of dibutyltin dilaurate. After stirring for 6 h at 75° C., an NCO value of 0.24% was reached. 1.9 g of methanol were added in order to convert the remaining NCO groups and stirring was effected for a further 2 h at 75° C. After storage overnight at room temperature, an NCO value of 0% was obtained.

Example 12

In a three-necked flask having a reflux condenser and stirrer, 402.86 g of polyisocyanate containing allophanate groups, 90.36 g of isopropylidene-dicyclohexanol, 0.44 g of methylhydroquinone and 0.88 g of 2,6-di-tert-butyl-p-cresol were mixed with 220.58 g of butyl acetate at room temperature. 0.20 g of dibutyltin dilaurate was added as a catalyst to the thoroughly mixed initially taken mixture. The reaction mixture was stirred for 1.5 h at 75° C. until the NCO value of the reaction mixture was 3.70%. Then followed the addition of 389.09 g of pentaerythrityl tri/tetraacrylate (commercial product from UCB, OH number=103 mg KOH/g) and 0.16 g of dibutyltin dilaurate. After stirring for 7 h at 75° C., an NCO value of 0.15% was reached. 1.3 g of methanol were added in order to convert the remaining NCO groups, dilution was effected with 158.00 g of butyl acetate and stirring was effected for a further 2 h at 75° C. After storage overnight at room temperature, an NCO value of 0% was obtained.

Example 13

In a three-necked flask having a reflux condenser and stirrer, 402.86 g of polyisocyanate containing allophanate groups, 51.50 g of cyclohexane-1,4-dimethanol, 0.41 g of methylhydroquinone and 0.84 g of 2,6-di-tert-butyl-p-cresol were mixed with 210.90 g of butyl acetate at room temperature. 0.18 g of dibutyltin dilaurate was added as a catalyst to the thoroughly mixed initially taken mixture. A weakly exothermic reaction occurred so that the internal temperature increased to about 48° C. in the course of 20 minutes. The reaction mixture was stirred for 1 h at 75° C. until the NCO value of the reaction mixture was 4.21%. Then followed the addition of 389.09 g of pentaerythrityl tri/tetraacrylate (commercial product from UCB, OH number=103 mg KOH/g) and 0.18 g of dibutyltin dilaurate. After stirring for 7 h at 75° C., an NCO value of 0.32% was reached. 2.6 g of methanol were added in order to convert the remaining NCO groups and stirring was effected for a further 2 h at 75° C. After storage overnight at room temperature, an NCO value of 0% was obtained.

Example 14

In a three-necked flask having a reflux condenser and stirrer, 402.86 g of polyisocyanate containing allophanate groups, 37.14 g of neopentylglycol, 0.41 g of methylhydroquinone and 0.83 g of 2,6-di-tert-butyl-p-cresol were mixed with 207.30 g of butyl acetate at room temperature. 0.18 g of dibutyltin dilaurate was added as a catalyst to the thoroughly mixed initially taken mixture. A weakly exothermic reaction occurred so that the internal temperature increased to about 30° C. in the course of 20 minutes. The reaction mixture was stirred for 1 h at 75° C. until the NCO value of the reaction mixture was 4.38%. Then followed the addition of 389.09 g of pentaerythrityl tri/tetraacrylate (commercial product from UCB, OH number=103 mg KOH/g) and 0.16 g of dibutyltin dilaurate. After stirring for 7 h at 75° C., an NCO value of 0.40% was reached. 3.2 g of methanol were added in order to convert the remaining NCO groups and stirring was effected for a further 2 h at 75° C. After storage overnight at room temperature, an NCO value of 0% was obtained.

Example 15

Comparison

In a three-necked flask having a reflux condenser and stirrer, 681.75 g of polyisocyanate containing allophanate groups, 290.00 g of hydroxyethyl acrylate, 0.49 g of methylhydroquinone and 0.97 g of 2,6-di-tert-butyl-p-cresol were mixed at room temperature. 0.19 g of dibutyltin dilaurate was added as a catalyst. The reaction mixture was stirred for 20 h at 75° C. until the NCO value of the reaction mixture was <0.1%.

Example 16

In a three-necked flask having a reflux condenser and stirrer, 681.75 g of polyisocyanate containing allophanate groups, 360.00 g of hydroxybutyl acrylate, 0.52 g of methylhydroquinone and 1.04 g of 2,6-di-tert-butyl-p-cresol were mixed at room temperature. 0.21 g of dibutyltin dilaurate was added as a catalyst. The reaction mixture was stirred for 20 h at 75° C. until the NCO value of the reaction mixture was <0.1%.

Use Examples

Determination of the performance characteristics of pendulum damping, Erichsen cupping and scratch resistance.

The determination of the pendulum damping was effected analogously to DIN 53157. For this purpose, the radiation-curable compositions were applied with a wet film thickness of 400 μm to glass. The wet films were first dried in air for 15 minutes at room temperature and then dried for 20 minutes at 100° C. The curing of the films obtained in this manner was effected in an IST coating unit (type M 40 2×1-R-IR-SLC-So inert) with 2 UV lamps (high-pressure mercury lamps type M 400 U2H and type M 400 U2HC) and a conveyor belt speed of 10 m/min under a nitrogen atmosphere ($O_2$ content≦500 ppm). The radiation dose was about 1900 mJ/cm².

The determination of the Erichsen cupping was effected analogously to DIN 53156. For this purpose, the respective formulation according to the invention was applied by means of a box coater with a wet film thickness of 200 μm to BONDER sheet 132. For curing, exposure to light was effected in the manner described above. The Erichsen cupping was then determined by pressing a metal ball into the uncoated side of the metal sheet. High values indicate high flexibility.

The determination of the scratch resistance was effected by means of the Scotch-Brite test after storage for 7 days in a conditioned chamber. In the Scotch-Brite test, a 3×3 cm silicon carbide-modified nonwoven (Scotch Brite SUFN, from 3M) was fastened as a test specimen to a cylinder. The latter presses the nonwoven with 750 g onto the coating and is moved pneumatically over the coating. The extent of the excursion is 7 cm. After 10 and 50 double strokes (DS), the gloss (eight-fold determination) is measured analogously to DIN 67530 at an angle of incidence of 20° in the middle region of the loading. The residual gloss in percent is obtained from the ratio of gloss after loading to initial gloss. After 50 double strokes, gentle wiping is effected twice with a soft cloth soaked in petroleum ether and the residual gloss is measured again. The reflow is then determined after 2 h at 80° C. in a drying oven by measuring the residual gloss.

The preparation of the radiation-curable material was effected by thorough mixing of 100 parts by weight of the urethane acrylates obtained under examples 1 to 16 with 4 parts by weight of 1-hydroxycyclohexyl phenyl ketone (commercial photoinitiator Irgacure® 184 from Ciba Spezialitätenchemie).

| Example | Pendulum damping [s] | Erichsen cupping [mm] |
|---|---|---|
| 1 | n.d. | 0.7 |
| 2 | 171 | 0.5 |
| 3 | 156 | 1.8 |
| 4 | 157 | 0.4 |
| 5 | 76 | 1.5 |
| 6 | 73 | 4.0 |
| 7 | 160 | 0.6 |
| 8 | 97 | 1.1 |
| 9 | 74 | 3.2 |
| 10 | 168 | 0.7 |
| 11 | 156 | 0.5 |
| 12 | 164 | 0.7 |
| 13 | 168 | 0.7 |
| 14 | 166 | 0.6 |
| 15 (comparison) | 161 | 1.1 |
| 16 | 155 | 1.5 |

| Example | Residual gloss [%] after 10 DS | Residual gloss [%] after 50 DS | Residual gloss [%] after petroleum ether | Residual gloss [%] after reflow 2 h 80° C. |
|---|---|---|---|---|
| 1 | 98.0 | 95.0 | 95.0 | 96.0 |
| 2 | 96.0 | 93.0 | 93.0 | 96.0 |
| 4 | 94.3 | 84.6 | 87.0 | 87.1 |
| 7 | 98.2 | 97.4 | 97.5 | 98.2 |
| 8 | 95.9 | 90.4 | 89.6 | 89.4 |
| 9 | 84.9 | 52.1 | 57.5 | 56.2 |
| 10 | 94.3 | 84.6 | 87.0 | 87.1 |
| 11 | 95.3 | 89.0 | 90.0 | 90.8 |
| 12 | 94.6 | 77.1 | 80.3 | 86.3 |
| 13 | 96.6 | 94.0 | 94.9 | 95.5 |
| 14 | 95.7 | 78.8 | 90.8 | 92.0 |
| 15 (comparison) | 62 | 52 | not determined | 85 |
| 16 | 70 | 56 | not determined | 99 |

We claim:

1. A polyurethane comprising allophanate groups and obtained by reacting the following components comprising:
   (a) at least one organic aliphatic, aromatic or cycloaliphatic di- or polyisocyanate,
   (b) at least two different compounds (b1) and (b2),
   (c) optionally, at least one compound having exactly two groups reactive toward isocyanate and no unsaturated groups,
   (d) optionally, at least one compound having at least three groups reactive toward isocyanate and no unsaturated groups, and
   (e) optionally, at least one compound having exactly one group reactive toward isocyanate and no unsaturated groups, wherein
   compound (b1) has exactly one group reactive toward isocyanate and exactly one unsaturated group capable of free radical polymerization, the unsaturated group being an ester of an α,β-unsaturated carboxylic acid, and compound (b2) has exactly one group reactive toward isocyanate and at least two unsaturated groups capable of free radical polymerization, the unsaturated groups capable of free radical polymerization being esters of α,β-unsaturated carboxylic acids, and
   wherein component (a) is reacted first with component (b1), thereby forming a polyisocyanate containing allophanate groups, which polyisocyanate containing allophanate groups is then reacted with component (b2).

2. The polyurethane according to claim 1, wherein the content of allophanate groups (calculated as $C_2N_2HO_3$=101 g/mol) is from 1 to 28% by weight of the polyurethane.

3. The polyurethane according to claim 1, wherein at least 20 mol % of the compounds (1) and (b2), based on 100 mol % of the compounds (b1) and (b2), are bonded to allophanate groups of the polyurethane.

4. The polyurethane according to claim 1, wherein the content of oxadiazinetrione groups in the isocyanates used (calculated as $C_3N_2O_4$=128 g/mol) is less than 15% by weight of the di- or polyisocyanate.

5. The polyurethane according to claim 1, wherein the content of oxadiazinetrione groups in the isocyanates used (calculated as $C_3N_2O_4$=128 g/mol) is less than 0.7% by weight of the polyurethane.

6. The polyurethane according to claim 1, wherein the content of oxadiazinetrione groups in the isocyanates used (calculated as $C_3N_2O_4$=128 g/mol) is from 0.2 to 0.6% by weight of the polyurethane.

7. The polyurethane according to claim 1, wherein the content of free isocyanate groups, calculated as NCO=42 g/mol, is less than 0.5% by weight of the polyurethane.

8. The polyurethane according to claim 1, wherein the component (a) is selected from the group consisting of hexamethylene diisocyanate, 1,3-bis(isocyanatomethyl)cyclohexane, isophorone diisocyanate and di(isocyanatocyclohexyl)methane.

9. The polyurethane according to claim 1, wherein the component (b1) is selected from the group consisting of 2-hydroxyethyl acrylate, 2-hydroxyethyl methacrylate, 2- or 3-hydroxypropyl acrylate and 1,4-butanediol monoacrylate.

10. The polyurethane according to claim 1, wherein the component (b2) is selected from the group consisting of the 1,2- or 1,3-diacrylate of glycerol, trimethylolpropane diacrylate, pentaerythrityl triacrylate, ditrimethylolpropane triacrylate and dipentaerythrityl pentaacrylate.

11. The polyurethane according to claim 1, wherein the component (c) is present.

12. The polyurethane according to claim 1, wherein the component (c) is present and is a cycloaliphatic diol.

13. The polyurethane according to claim 1, wherein the component (d) is present.

14. The polyurethane according to claim 1, wherein the component (e) is present and is a cycloaliphatic alcohol.

15. The polyurethane according to claim 1, wherein the component (e) is present and is an aliphatic alcohol having 6 to 20 carbon atoms.

16. The polyurethane according to claim 1, wherein the component (e) is present and is an aliphatic alcohol having 1 to 4 carbon atoms.

17. The polyurethane according to claim 1, wherein the molar composition (a):(b1):(b2):(c):(d):(e) per 1 mol of reactive isocyanate groups in (a) is (b1) 1-50 mol % of groups reactive toward isocyanate,
(b2) 1-50 mol % of groups reactive toward isocyanate,
(c) 0-50 mol % of groups reactive toward isocyanate,
(d) 0-10 mol % of groups reactive toward isocyanate,
(e) 0-5 mol % of groups reactive toward isocyanate,
with the proviso that the sum of the groups reactive toward isocyanate corresponds to the number of isocyanate groups in (a).

18. The polyurethane according to claim 1, wherein component (a) is reacted with component (b1) to form a polyisocyanate comprising allophanate groups, and said polyisocyanate comprising allophanate groups is reacted with component (b2) and optional components (c), (d) and (e).

19. A radiation-curable coating material comprising
at least one polyurethane according to claim 1,
optionally, at least one compound having one or more than one double bond capable of free radical polymerization, and
optionally, at least one photoinitiator.

\* \* \* \* \*